United States Patent
Trissel

(10) Patent No.: US 7,414,245 B2
(45) Date of Patent: Aug. 19, 2008

(54) SCINTILLATOR-BASED MICRO-RADIOGRAPHIC IMAGING DEVICE

(76) Inventor: Richard G. Trissel, 24652 Pescadero Rd., Carmel, CA (US) 93923

(*) Notice: Subject to any disclaimer, the term of this patent is extended or adjusted under 35 U.S.C. 154(b) by 0 days.

(21) Appl. No.: 11/409,461

(22) Filed: Apr. 20, 2006

(65) Prior Publication Data
US 2007/0246655 A1    Oct. 25, 2007

(51) Int. Cl.
*G01T 1/20* (2006.01)
*G21K 7/00* (2006.01)

(52) U.S. Cl. .................. 250/361 R; 250/362; 250/368; 378/43

(58) Field of Classification Search .............. 378/43
See application file for complete search history.

(56) References Cited

U.S. PATENT DOCUMENTS

| | | | | |
|---|---|---|---|---|
| 3,383,510 A | * | 5/1968 | Sellers ................. | 378/120 |
| 5,001,737 A | * | 3/1991 | Lewis et al. ........... | 378/147 |
| 5,351,279 A | * | 9/1994 | She et al. ............. | 378/43 |
| 5,723,865 A | * | 3/1998 | Trissel et al. .......... | 250/368 |
| 6,091,796 A | * | 7/2000 | Trissel et al. .......... | 378/43 |

* cited by examiner

*Primary Examiner*—David P. Porta
*Assistant Examiner*—Carolyn Igyarto
(74) *Attorney, Agent, or Firm*—John R. Ross

(57) ABSTRACT

A scintillation based imaging system. The device utilizes a single-crystal inorganic scintillator to convert ionizing radiation to light in a spectral range or ranges within the visible or ultraviolet spectral ranges. The conversion takes place inside the single crystal material, preserving special resolution. The single crystal scintillator is sandwiched between a first plate that is substantially transparent to the ionization radiation and a second plate that is transparent to the visible or ultraviolet light. The ionization radiation is directed from the submicron source through a target to create a shadow image of the target inside the scintillator crystal. Several submicron sources of radiation are described. These include submicron x-ray and high-energy ultraviolet sources, submicron electron beam sources, submicron alpha particle sources, submicron proton sources, submicron positron sources and sub-micron neutron sources. Also, Applicants describe submicron spot size x-ray sources produced using electron beams alpha particles, protons and positrons. In preferred embodiments larger size sources are converted to submicron sources by focusing the radiation to a submicron neck, by blocking all but a submicron portion using a pinhole arrangement or by channeling the radiation with a pinhole funnel.

20 Claims, 18 Drawing Sheets

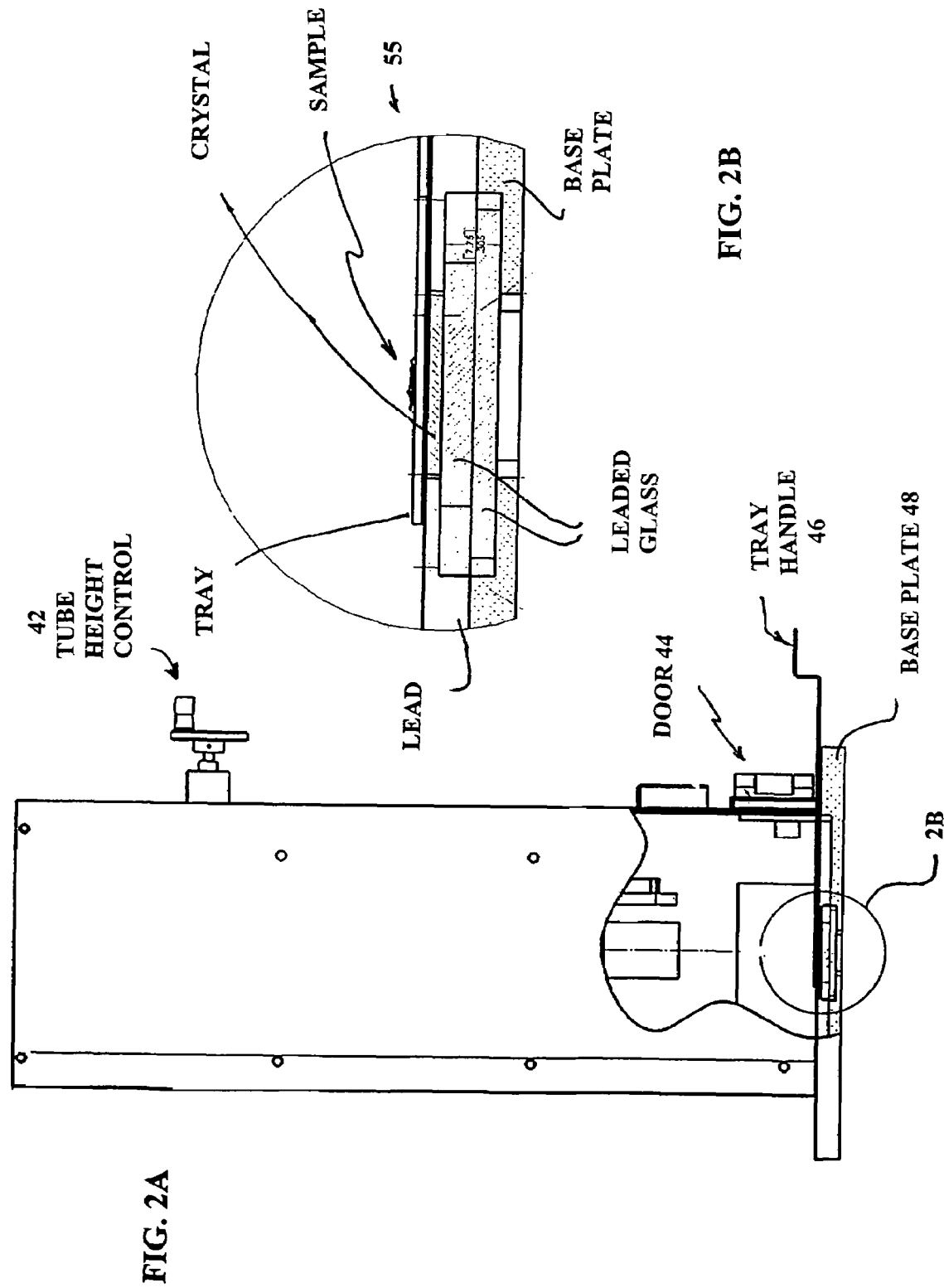

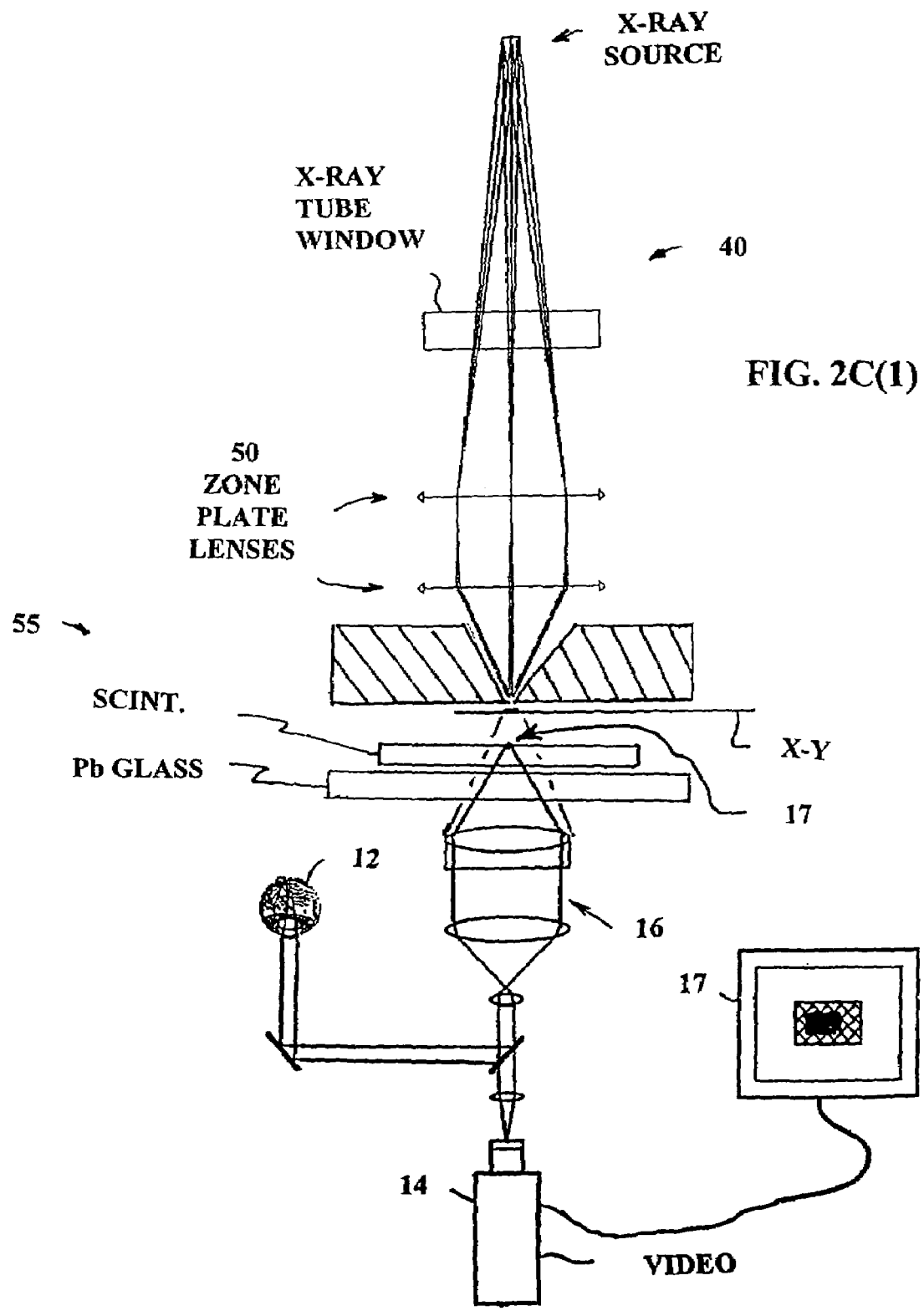

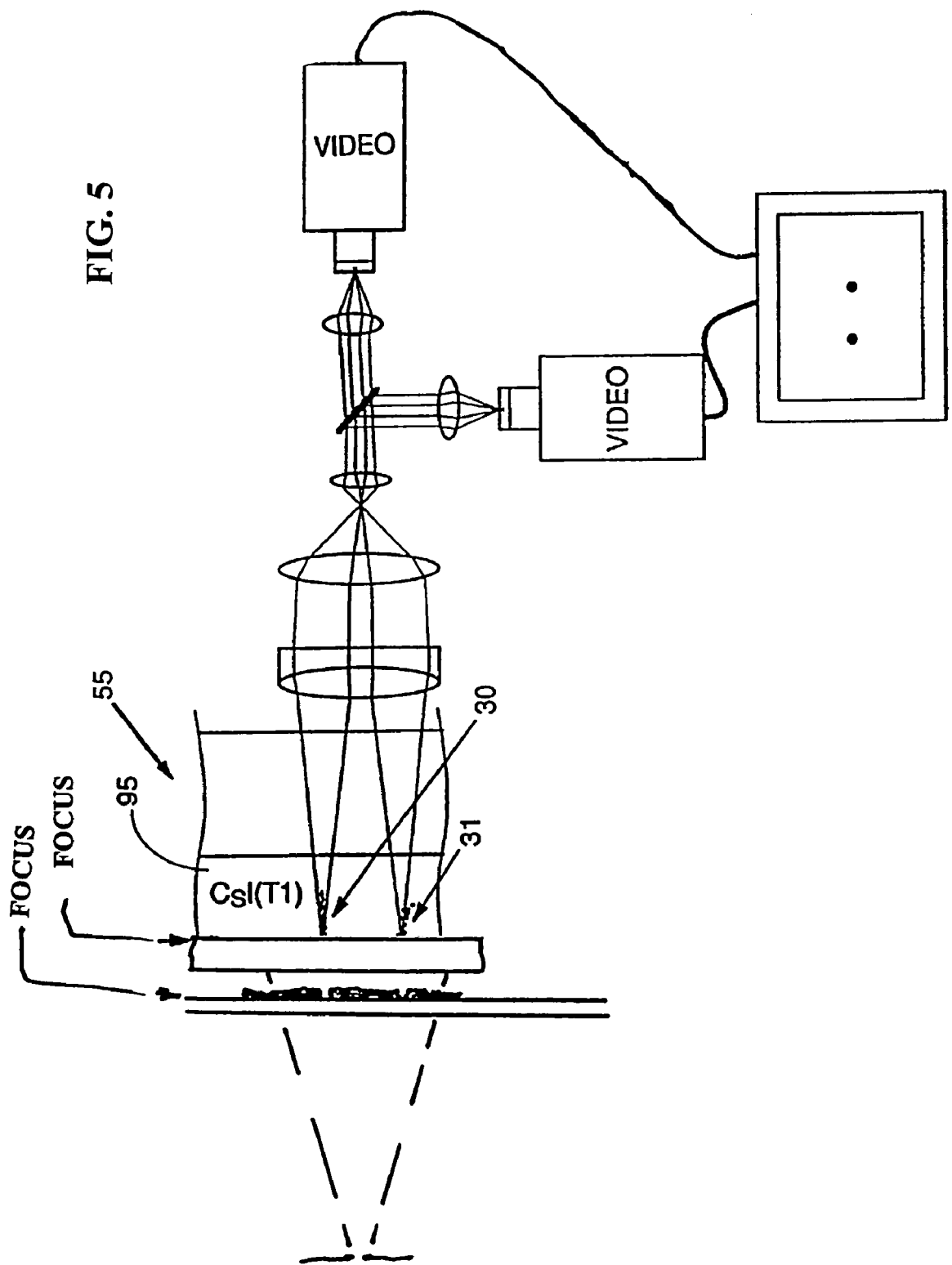

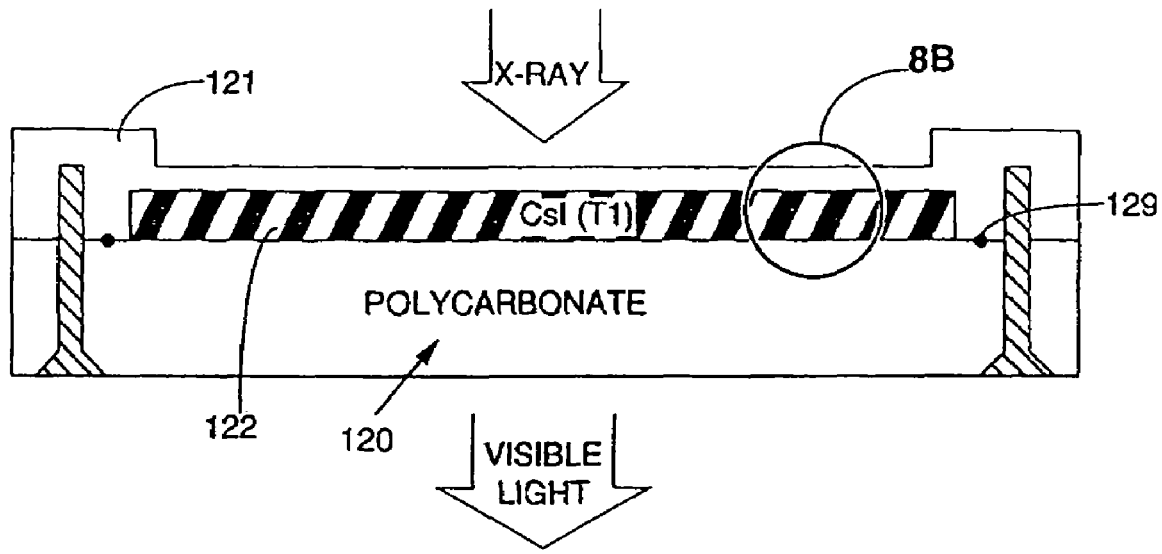
FIG. 8A(1)
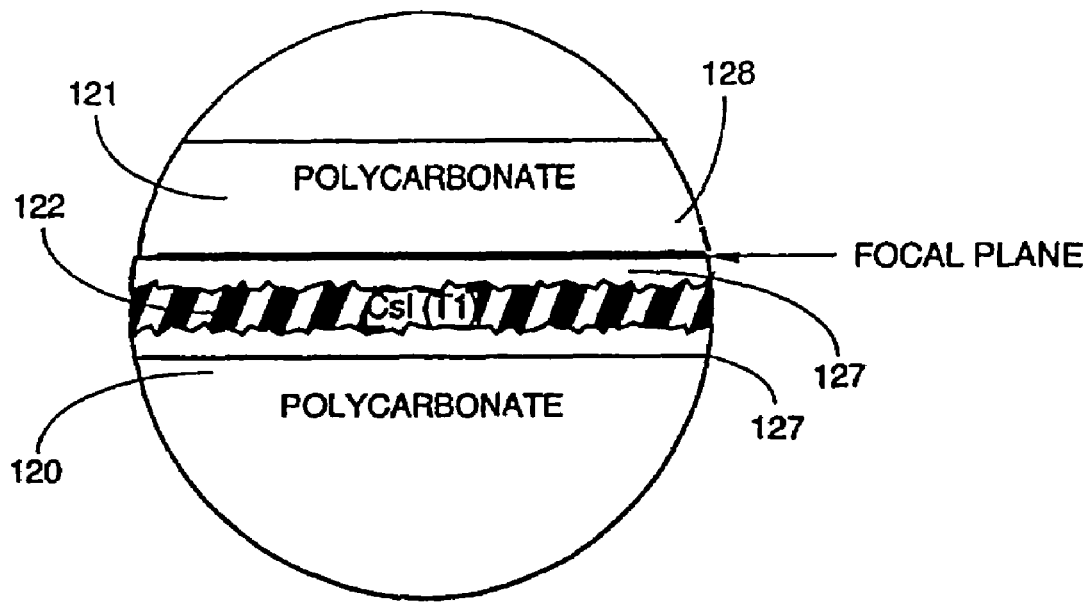
FIG. 8B(1)

SCINTILLATOR-BASED MICRO-RADIOGRAPHIC IMAGING DEVICE

This invention relates to imaging devices and in particular to scintillator based microscopes.

BACKGROUND OF THE INVENTION

In most microscopes, the visible light spectrum is used for imaging. X-ray microscopes are known. Two principal advantages of an x-ray microscope over a visible light microscope are (1) better potential resolution of extremely small features due to shorter wavelengths; and (2) some internal features can be observed which cannot be seen with a visible light microscope.

Most x-ray imaging devices involve directing a beam of x-rays through an object onto a phosphor screen, which converts each x-ray photon into a large number of visible photons. The visible photons expose a sheet of photographic film placed close to the phosphor thus forming an image of the attenuation of x-rays passing through the object.

There are several limitations to film-screen x-ray devices. A major limitation is that the film serves the combined purpose of both the image acquisition function and the image display function. In addition, the range of contrast or latitude of the film is too limited to display the entire range of contrast in many objects of interest. Because of the limited latitude and dual acquisition/display function of film, a film-screen x-ray is often overexposed in one area and underexposed in another area due to the thickness and composition variations of the object across the image. The gray-scale level of x-ray film has a sigmoidal response as a function of exposure which results in difficulties in distinguishing contrast differences at the extremes of the exposure range; that is, in the most radiodense and in the most radiolucent areas of the image.

Digital x-ray techniques have been proposed as a technology which replaces the phosphor/film detector with a digital image detector, with the prospect of overcoming some of the limitations of film-screens in order to provide higher quality images. A potential advantage of digital x-ray technology involves the separation of the image acquisition function from the image display function. Digital detectors also provide a much greater range of contrast than film and the contrast response function is linear over the entire range. This would allow a digital detector to more easily distinguish subtle differences in attenuation of x-rays as they pass through various paths of the object. Differences in attenuation due to thickness and composition variations across the object can be subtracted out of the digital data in the computer and the residual contrast can then be optimized for the particular viewing mechanism, be it film or computer monitor. The residual contrast differences can then be analyzed to search for things of interest. Other advantages of digital x-ray technology include digital image archival and image transmission to remote location for viewing purposes.

Prior Art Scintillator Based Microscope

A prior art scintillator based microscope designed and patented by one of the Applicants and others is shown in FIG. 1 and FIG. 7. This microscope was designed in particular for imaging tiny integrated circuits. A target 2 is mounted on an x-ray transparent x-y translation stage 4. An x-ray source 6 is mounted below sample 2 so that its x-ray beam 8 is directed through target 2 to scintillator assembly 55. A portion of the x-ray photons in beam 8 are stopped by target 2 producing a shadow image of target 2 at the illumination surface of scintillation assembly 55. X-ray photons impinging on scintillator assembly 55 pass through an optical reflecting layer 92 and produce scintillations in scintillation assembly 55 and visible green light from these scintillations including visible light reflected from reflecting layer 92 is detected by human eye 12 or video camera 14 through microscopic optical system 16. The image detected by video camera 14 can be displayed on monitor 17. A leaded glass plate assures that human viewers and electronic equipment is not exposed to the x-radiation.

FIGS. 6A through 6D display, in detail, a method for fabricating the scintillator assembly 55. The scintillator crystal used in the assembly was a thallium-doped cesium iodide CsI (T1) crystal having a peak scintillation wavelength at 550 nanometers producing green visible light. Additional details are provided in the U.S. Pat. No. 6,091,796 which is hereby incorporated herein by reference.

Small Spot Size Sources

X-ray sources with very small spot sizes have been reported. For example, the following is an excerpt from a recent report from the Argonne National Labortory:

ARGONNE, Ill. (Mar. 31, 2006)—An award-winning device developed at the U.S. Department of Energy's Argonne National Laboratory has set a world's record for tiny spot size with a hard X-ray beam. The device is called a Multilayer Laue Lens. The wafer from which the device was made won a 2005 R&D 100 award, given to the world's top 100 scientific and technological innovations. The enhancements to the device have now increased its ability to focus the X-rays with an energy level of 19.5 keV to 30 nanometers. For comparison, the period at the end of this sentence is approximately one million nanometers in diameter.

The Need

Current digital x-ray devices have fairly limited resolution and so they are limited in their applications. The device described in Applicant's '796 patent has good resolution but improvements are needed for it to have extensive application, particularly in biomedical applications. What is needed is high resolution imaging devices with a sub-micron radiation source and an optical microscopic system for providing geometric magnification for imaging nanometer size internal features of tiny targets.

SUMMARY OF THE INVENTION

The present invention provides a scintillation based imaging system. The device utilizes a single-crystal inorganic scintillator to convert ionizing radiation to light in a spectral range or ranges within the visible or ultraviolet spectral ranges. The conversion takes place inside the single crystal material, preserving spatial resolution. The single crystal scintillator is sandwiched between a first plate that is substantially transparent to the ionization radiation and a second plate that is transparent to the visible or ultraviolet light. The ionization radiation is directed from the submicron source through a target to create a shadow image of the target inside the scintillator crystal.

Several submicron sources of radiation are described. These include submicron x-ray and high-energy ultraviolet sources, submicron electron beam sources, submicron alpha particle sources, submicron proton sources, submicron positron sources and sub-micron neutron sources. Also, Applicants describe submicron spot size x-ray sources produced using electron beams alpha particles, protons and positrons. In preferred embodiments larger size sources are converted to submicron sources by focusing the radiation to a submicron neck, by blocking all but a submicron portion using a pinhole arrangement or by channeling the radiation with a pinhole funnel.

In preferred embodiments using a Thallium-doped Cesium Iodide CsI (T1) crystal having a peak scintillation wavelength at 550 nanometers portions or all of the magnified shadow image is viewed at the crystal's 550 nm scintillation wavelength with a magnifying optical element such as the optical elements of a conventional optical microscope to provide a very high resolution image of the target or portions of the target. The green light magnified image may be directly observed with the eyes of a human operator or the image may be captured on film or an image sensor. In preferred embodiment the surface of the target is illuminated with visible light (with the green portion of the spectrum filtered out) so that a surface image can be compared with the x-ray image. This in preferred embodiments is accomplished using a dual focus feature with one focus at or near the illumination surface of the scintillation crystal and the other focus at the surface of the target.

The thickness and materials for the first and second sandwiching plates are preferably chosen to provide desired shielding from the ionization radiation. In preferred embodiments special software may be provided to permit tomographic imaging.

BRIEF DESCRIPTION OF THE DRAWINGS

FIGS. 2C(1), 2D and 2E show alternatives to the embodiment shown in FIG. 2C.

FIG. 5 demonstrates a dual focus system.

FIGS. 8A(1) and 8B(1) show how to fabricate a scintillator sandwich for the present invention.

DETAILED DESCRIPTION OF PREFERRED EMBODIMENT

Figure 1:
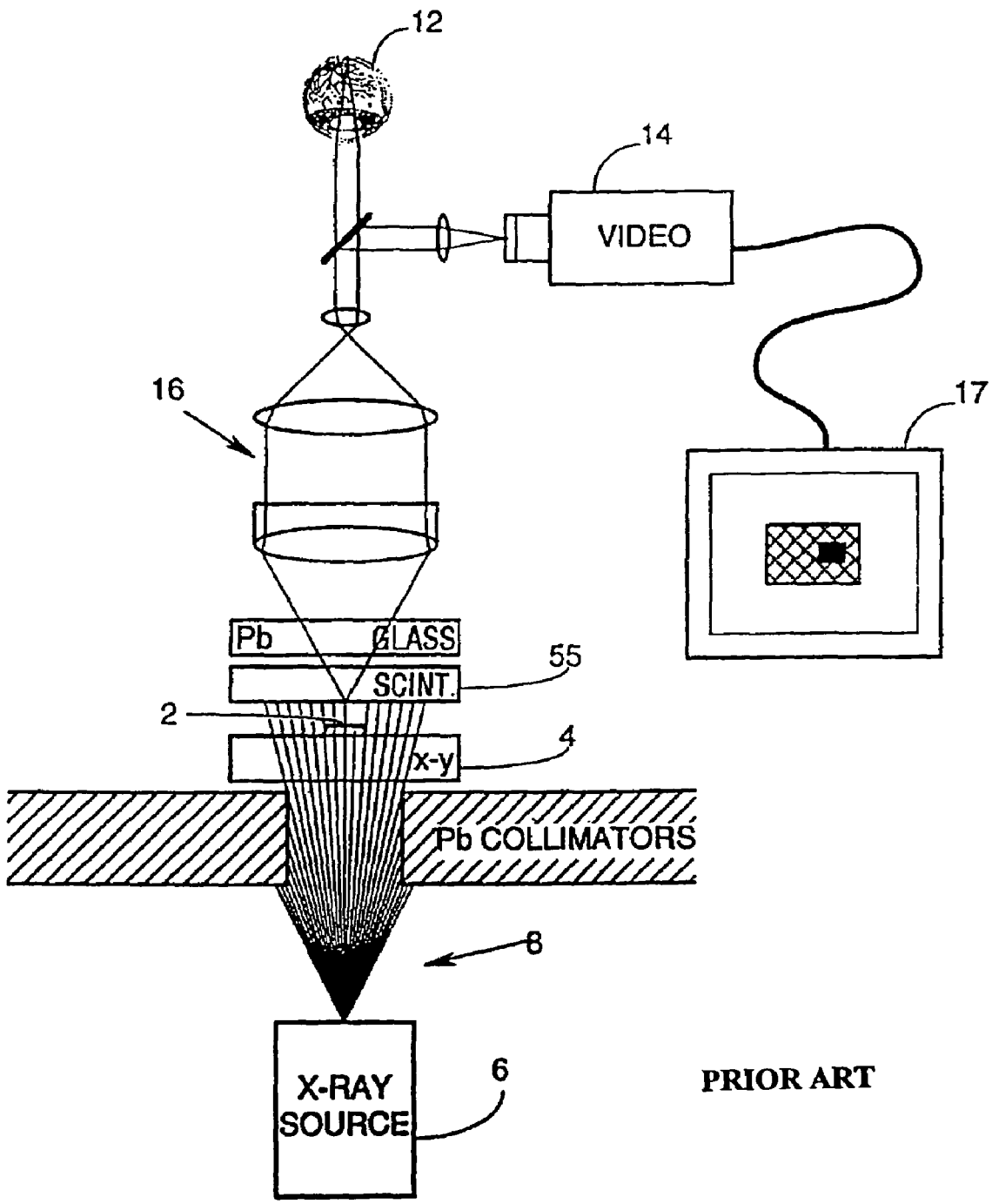
FIG. 1 is a drawing showing features of a prior art x-ray microscope.

Preferred embodiments of the present invention are described below by references to the figures.

First Preferred Embodiment

A prototype device having important features of the present invention can be described by reference to FIGS. 2, 2A, 2B and 2C. In FIG. 2C a target 2 is mounted on an x-ray transparent x-y translation stage 4. An x-ray source 6 is mounted above sample 2 and the x-ray beam 8 is directed downward through pinhole assembly 9. The beam illuminates and passes through target 2 to scintillator assembly 55. A portion of the x-ray photons in beam 8 are stopped by target 2 producing a shadow image of target 2 at the illumination surface of scintillation assembly 55. The illumination surface is spaced away from pinhole assembly 9 so that the features of target are geometrically magnified on the surface of scintillator assembly 55; however, in the prototype device the spot size was too large to produce good geometric images at the resolution of the scintillator and microscope. X-ray photons impinging on scintillator assembly 55 produce scintillations in scintillation assembly 55 and light from these scintillations are detected by human eye 12 and/or video camera 14 through microscopic optical system 16. The image detected by video camera 14 can be displayed on monitor 17. A leaded glass plate assures that human viewers and electronic equipment is not exposed to the x-radiation. In this embodiment the microscope optics are focused on the illumination surface of scintillator assembly 55 as shown at 17 in FIG. 2C. Scintillator assembly 55 is comprised of a CsI crystal doped with thallium.

X-Ray and Scintilator Housing

Figure 2:
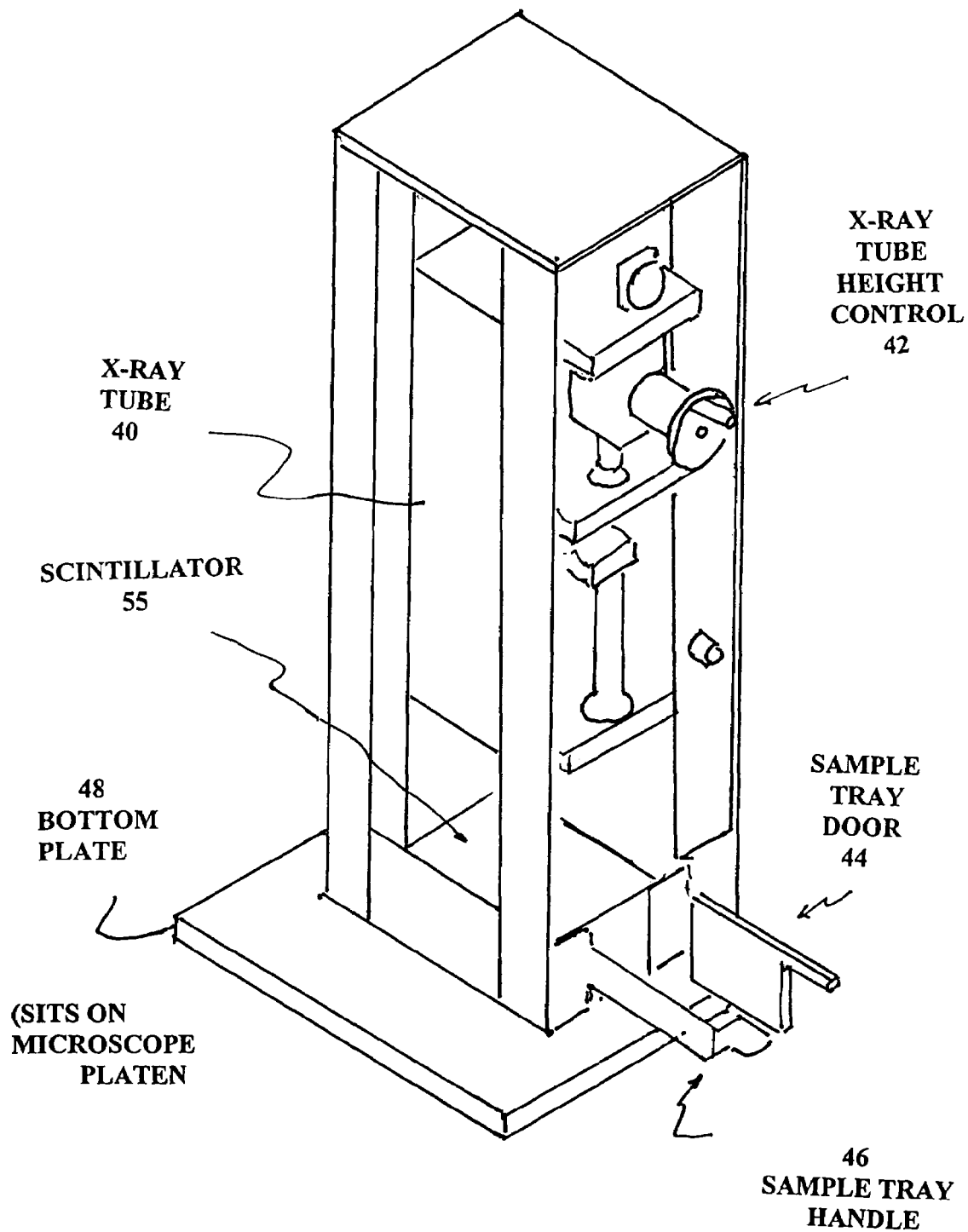
FIG. 2 is a perspective drawing of a portion of a preferred embodiment of the present invention.
Figure 2C:
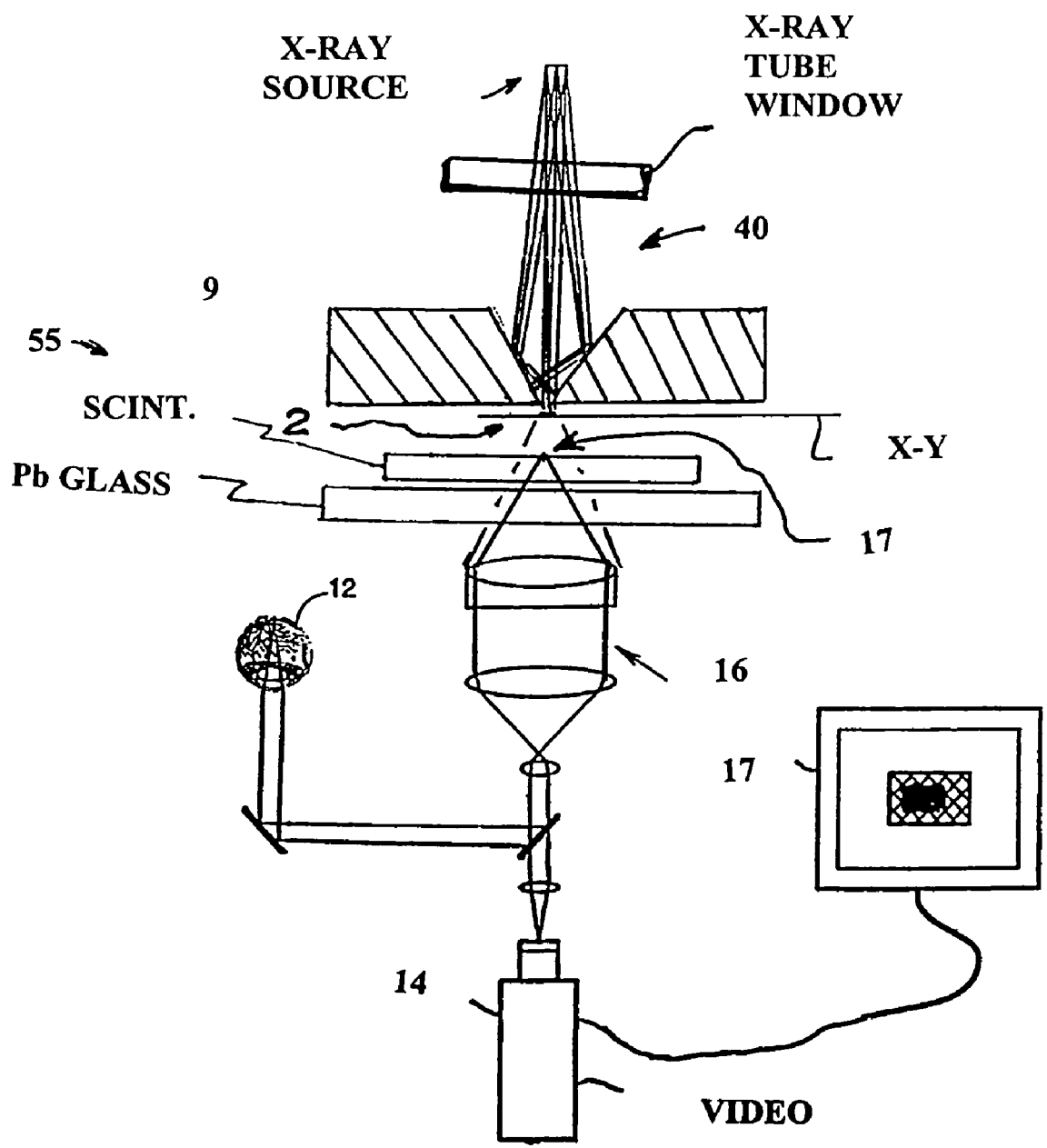
FIG. 2C shows the orientation of the components of an X-ray microscope system according to the present invention.
Figure 2D:
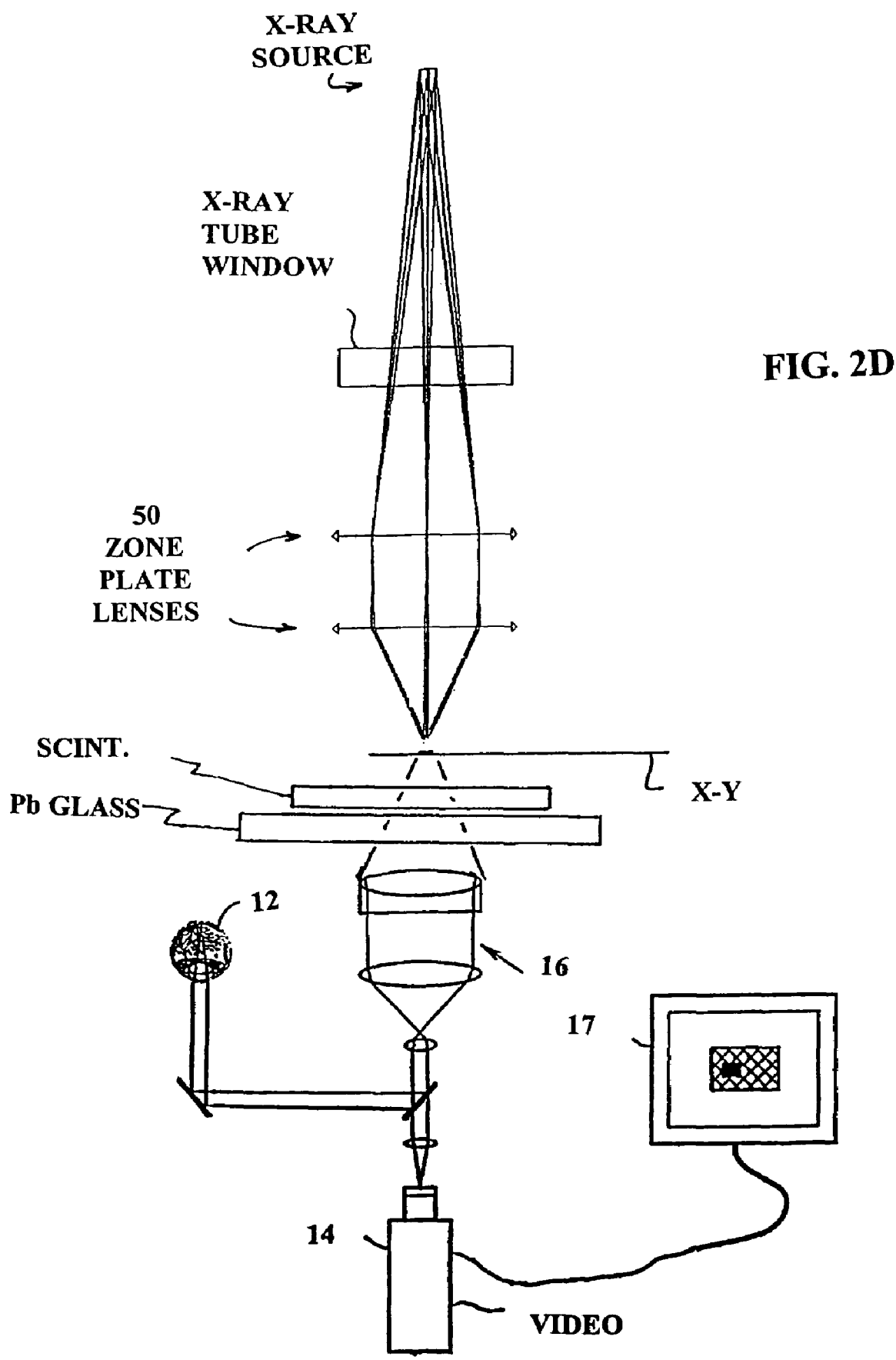
FIG. 2A is a side view of the portion shown in FIG. 2.
FIG. 2B is a drawing of a smaller portion of the portion shown in FIG. 2A showing a sample and a scintillation crystal.
Figure 2E:
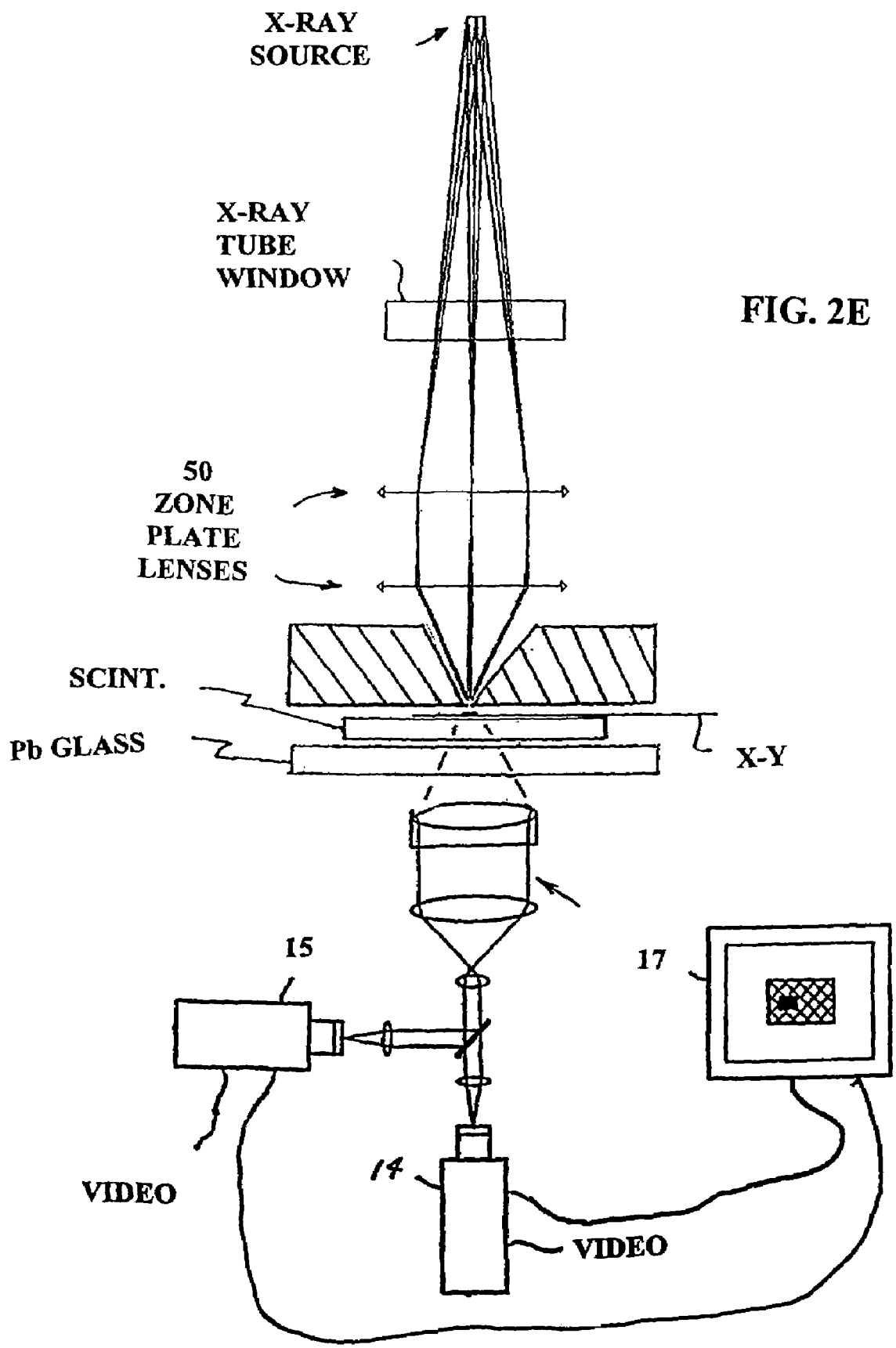

A prototype design of an x-ray and scintillator housing is shown in FIGS. 2, 2A and 2B. For this preferred design the x-ray source 40 (in this case an x-ray tube) is located above the sample and the optical microscope assembly 16 is located below the sample as shown in FIG. 2C. For this prototype device then an x-ray spatial filter (pinhole) is placed at the re-imaged spot to reduce the spot size at the cost of reduced power

CsI Sandwich

FIGS. 6A through 6D display, in detail, our currently preferred method for fabricating the scintillator assembly 55. This assembly is similar to the one described in the '796 patent except the optical reflection layer is not included. It is very important to produce scintillators having a very good optical quality reflecting surface. This is a problem because producing a very flat surface on CsI crystals is difficult. We use an optically transparent single crystal scintillator 94. The preferred scintillator material is a thallium-doped cesium iodide CsI (T1) crystal which is surfaced on both sides to the thickness dimension desired (in this case about 0.25 cm) using a diamond fly cutting procedure or any other procedure which produces an optical quality surface with less than about 100 angstroms of surface roughness and preferably less than about 40 angstroms. We then bond an optical quality polycarbonate plate 95, which is about 0.40 cm thick, to the CsI crystal. We choose an optical grade adhesive 10 which is index-matched as well as possible to the CsI index of refraction. A preferred adhesive is Summers Labs UV74 mixed with 9-vinyl carbazole monomer which is cured with UV light. Its index of refraction when cured is 1.6. The polycarbonate plate 95 provides structural rigidity over the entire surface area of the crystal. The index of refraction of the polycarbonate plate (1.59) closely matches that of the CsI crystal and the adhesive closely matches both materials. Therefore, we minimize light scatter and other boundary interface artifacts in the final light image. Fresnel reflections at these interfaces cause losses through the sandwich as well as contribute to scattered light that can degrade image quality. A separate 0.1 cm thick sheet of polycarbonate 91 is then bonded, using the same adhesive 10, to the top of the CsI crystal 94. Polycarbonate sheet 91 is then machined at the other side to a thickness of about 0.025 cm in order to minimize the attenuation of x-rays passing through the sheet 91. We calculate that greater than 98% of the x-rays striking scintillator assembly 55 pass through the polycarbonate sheet 91 and are absorbed in the first 200 microns of the CsI crystal 94 which converts each x-ray photon into a large number of visible light photons. These visible light photons are emitted into a 4 .pi steradians and the photons hitting the reflective coating are reflecting back towards the optical system thus effectively doubling the visible light available for viewing by the eye 12 or the video camera 14. A focused, visible light image representing the attenuation of x-rays through the object being x-rayed is therefore produced at the surface between the scintillator and layer 91.

Essential to the usefulness of any general-purpose scintillator is adequate structural integrity as well as resistance to any potentially damaging moisture while exposed to expected environmental conditions. The CsI (T1) and other related crystals are typically hygroscopic and therefore require a barrier between their outer surfaces and nearly all environments. We accomplished this sealing through the implementation of optical-quality polycarbonate plastic plates. Polycarbonate was chosen because its coefficient of thermal expansion (CTE) in addition to its optical indexes is relatively close to that of CsI. However, other transparent materials with similar thermal expansion and optical characteristics may also be used.

The substantially polycarbonate plate 5 which is placed on the optical side of the sandwich is also designed to enhance the structural integrity as well as seal out the moisture. The plate is relatively thick (.about.4 mm) and is anti-reflection coated with coating 98 to minimize Fresnel reflections from its outer surface. As indicated by the following formula, optical indices of adjoining materials should be closely matched to reduce unwanted reflections:

$$R = \frac{(n_1 - n_2)^2}{(n_1 + n_2)^2}$$

where $n_1$—index of material 1, $n_2$=index of material 2 and R is the Fresnel reflection.

For our CsI crystal, the index of refraction at the peak scintillation wavelength (of 550 nm) is 1.793. The index of refraction for our optical adhesive is 1.6. This gives a Fresnel reflection of about 0.4% at the x-ray illumination surface of the crystal. It is important that this reflection be kept low especially at this junction. The reflection here should preferably be kept less than about 0.5%. For some applications we have learned that the reflection problem can become acute if the Fresnel reflection exceeds about 1%.

The overall thickness of our preferred scintillation sandwich is slightly larger than 3.5 mm consisting of the following layers starting at the x-ray incident side:

| | |
|---|---|
| Polycarbonate Top Layer | 0.25 mm |
| Optical Adhesive | 0.05 mm |
| CsI Crystal | 1.50 mm |
| Optical Adhesive | 0.05 mm |
| Pb Glass | 4.00 mm |
| Anti-Reflection Coating | 0.01 mm |

Incorporation of Optical Reflecting Layer in CsI Crystal Assembly

Figure 8A:
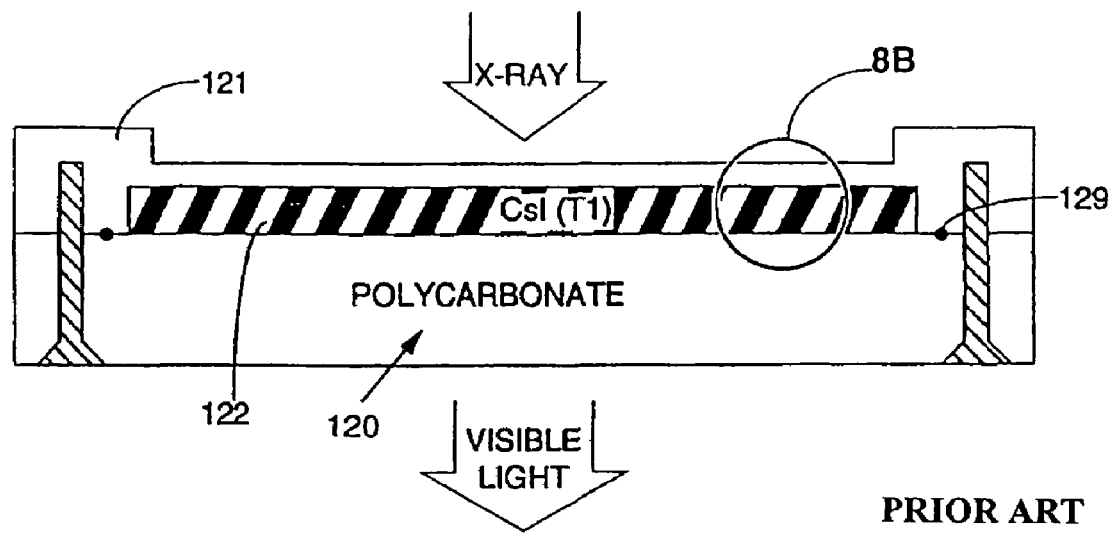
FIGS. 8A and 8B show how to fabricate a prior art scintillator sandwich.
Figure 8B:
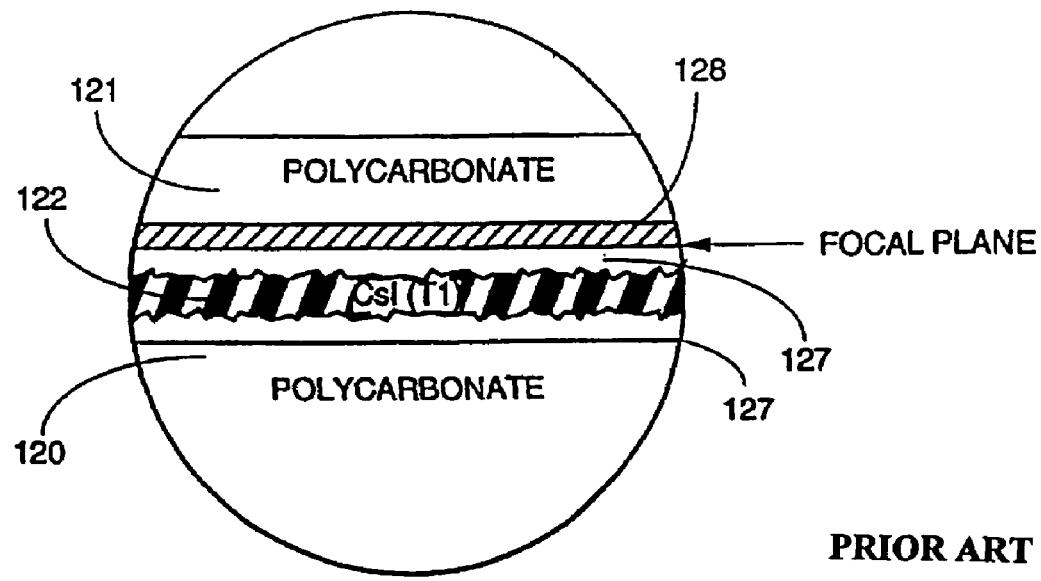

FIGS. 8A and 8B demonstrate another preferred scintillation sandwich incorporating the principals of the present invention. In this case the CsI crystal 122 is contained between polycarbonate base plate 120 and polycarbonate cover plate 121 as was proposed in the '796 patent. Cover plate 121 as above is coated with a thin aluminum layer 128 to provide an x-ray transparent optically reflecting surface. The spaces between the crystal and the reflecting surface 128 of cover plate 121 is filled with an index matching fluid having an index refraction almost exactly matching that of the CsI crystal. We used in both spaces Cargille hd=1.70, B-series index matching fluid. The thickness of the fluid was about 20 .mu.m microns compared to a crystal thickness of about 1.55 mm O-ring 129 assures a good seal. Note in FIG. 8B the thickness spaces filled with the fluid is exaggerated. Note, also we have emphasized the flatness of the mirror surface at the bottom of reflective layer 128 and the jaggedness of the upper and lower surfaces of CsI crystal 122 in order to indicate the importance of the index matching fluid in improving the optical performance of the sandwich. As indicated in FIG. 8B we focus our camera on the reflective surface which provides a very precise image of all scintillations in Crystal 122 including the light reflected off the mirror. Because of the close match of the fluid and the crystal, there are virtually zero reflections from the rough surface of the CsI crystal.

Submicron Ionization Sources

Using Fresnel Zone Plates

For high-resolution applications that require soft x-rays (<20 keV) for optimal contrast, such as biological samples, a small-spot, high current, low potential x-ray tube is needed. Currently there are no commercial sources available. However, as described above and as shown in FIG. 2C and other figures, a large-spot soft x-ray tube could be re-imaged using two X-ray Fresnel zone plate lenses as shown in FIGS. 2C(1), 2D and 2E, which work well for low energy x-rays. If the re-imaged spot is still too large, then an x-ray spatial filter (pinhole) could be placed at the re-imaged spot to reduce the spot size at the cost of reduced power. This approach simplifies the task of placement of the spot very close to the target.

Pinhole

A larger source can be turned into a submicron source using a submicron pinhole as shown in FIG. 2C. The consequence of creating a submicron source with this technique is the photon count is drastically reduced. The problem of low count may be overcome by a relatively long exposure times or averaging of many image frames.

X-Ray Funnel

Figure 3A:
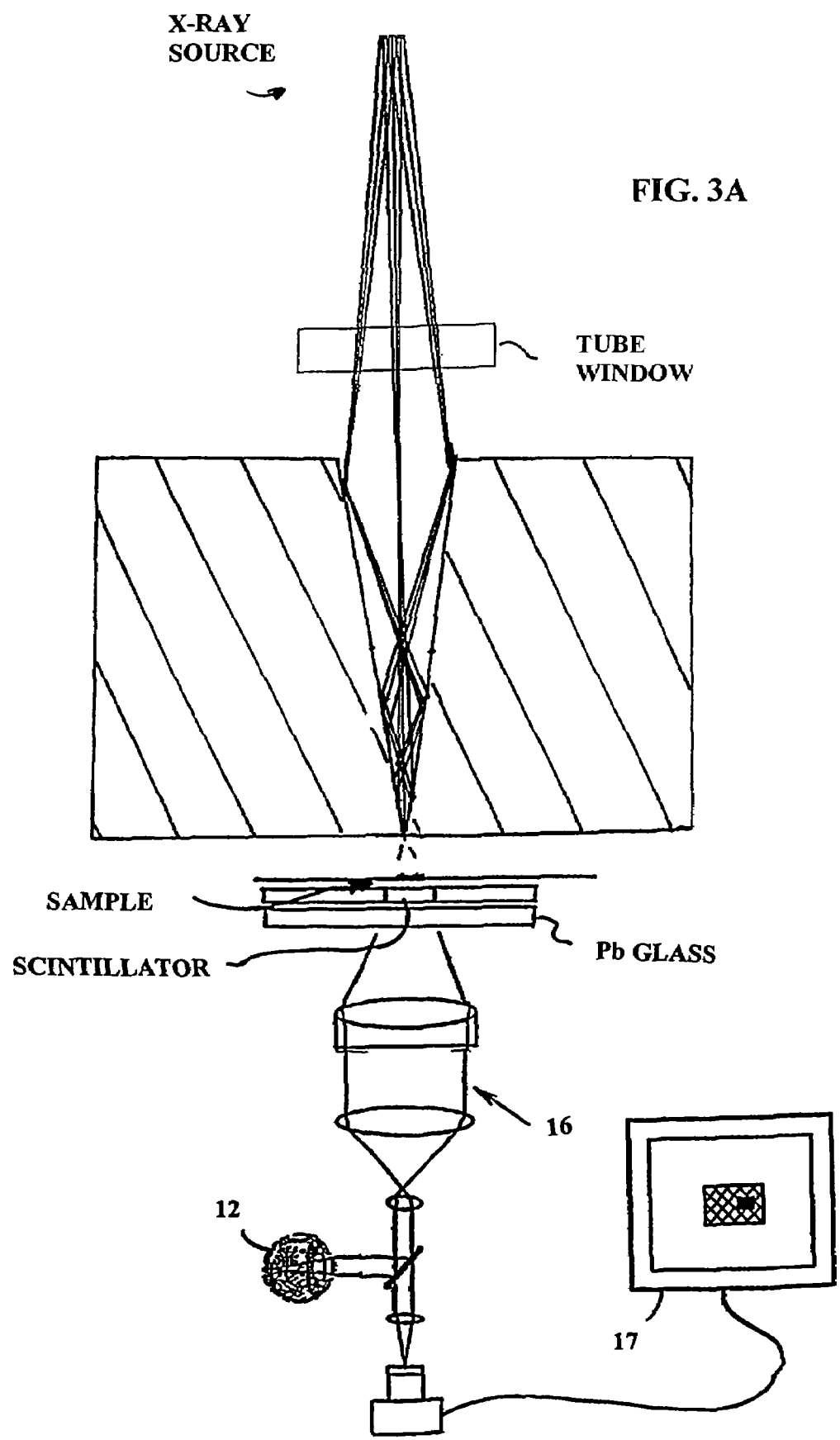
FIGS. 3A and 3B show features of an embodiment utilizing a funnel approach for directing X-rays into a spot size X-ray source.
Figure 3B:
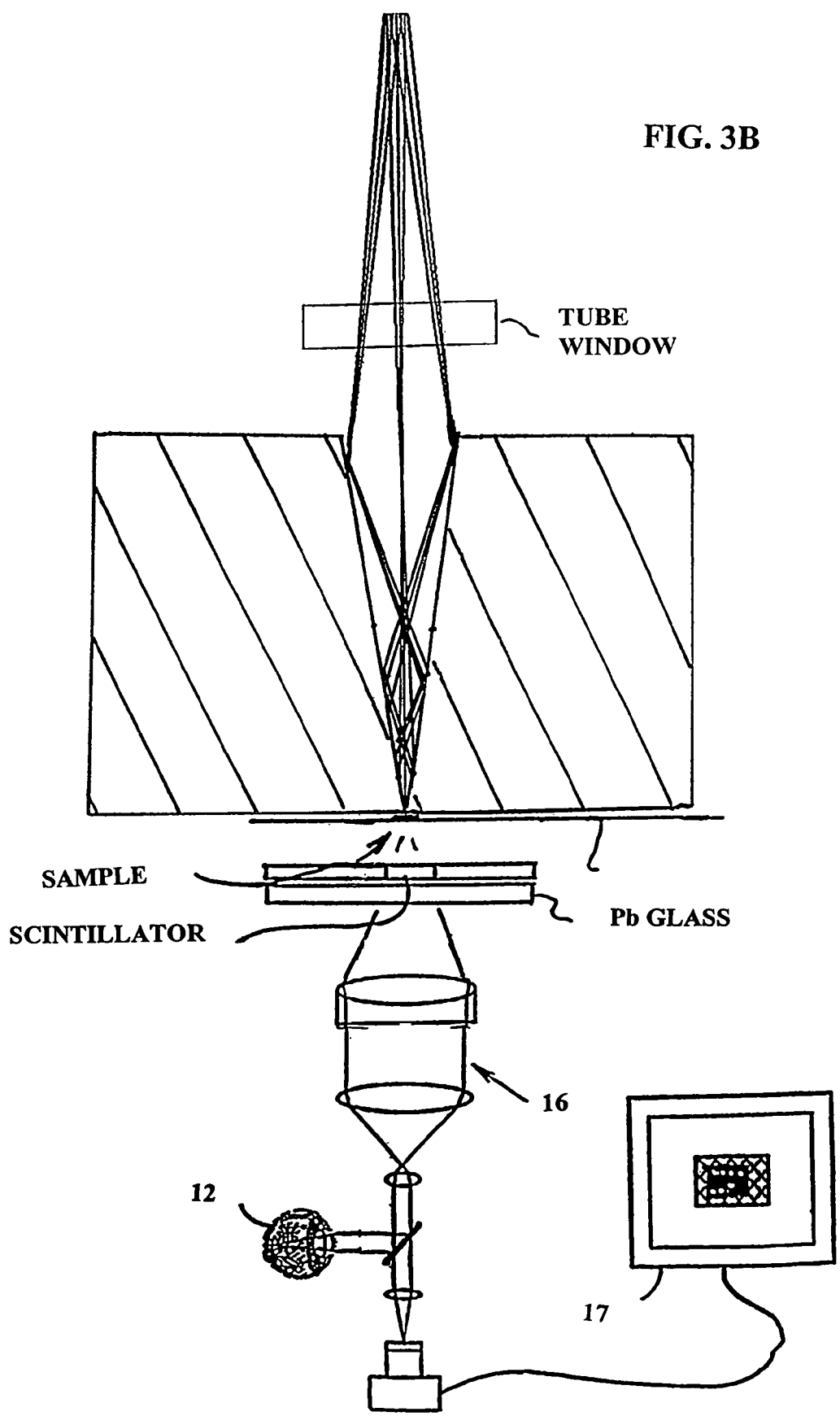

Another technique for producing small spot sizes is to utilize a funnel type pinhole as suggested by FIGS. 3A and 3B. In a preferred embodiment the entrance diameter is the same size as the X-ray tube window. The material in which the funnel type pinhole is machined is preferably a heavy metal such as tungsten or a tungsten alloy. In FIG. 3B the target has been moved very close to the pinhole and the scintillator is located a substantial distance providing a geometric magnification of about 1 to 10. Applicants estimate that they can achieve magnification of about 1 to 30 with this general configuration based on a funnel pinhole diameter of about 0.5 microns.

Adjustable Pinhole

In other preferred embodiments an adjustable pinhole (as described at Col. 5 in the '796 patent) could be utilized to provide an adjustable trade-off between resolution and photon count.

Radioactive Submicron Tip

Figure 4:
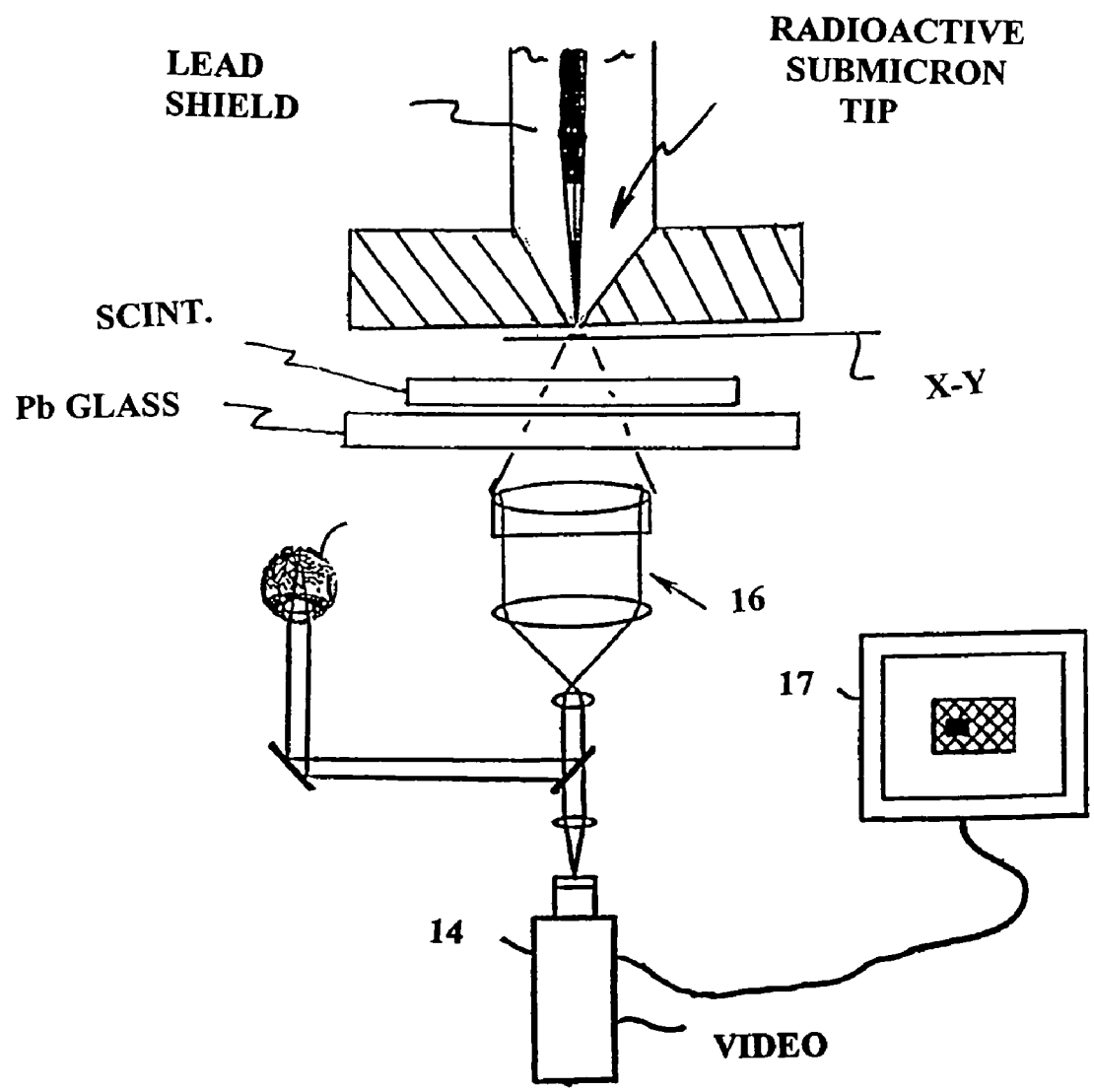
FIG. 4 is a drawing showing the use of a radioactive source with a submicron tip.
Figure 6A:
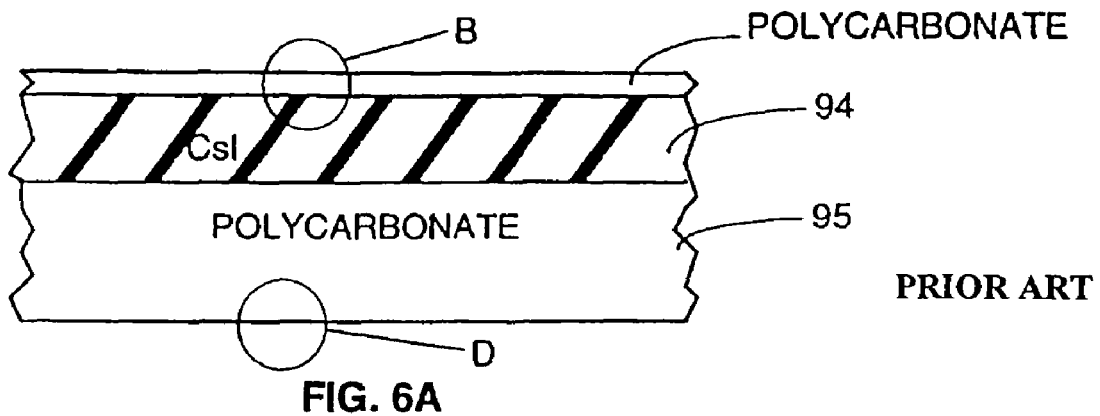
FIGS. 6A through 6D shows the optical configuration of a prior art scintillator.
Figure 6B:
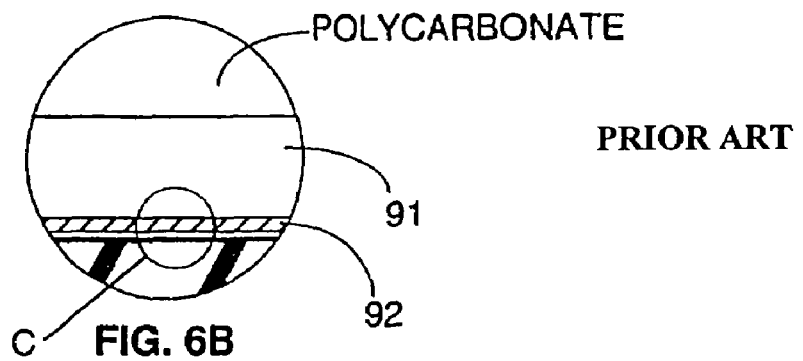
Figure 6C:
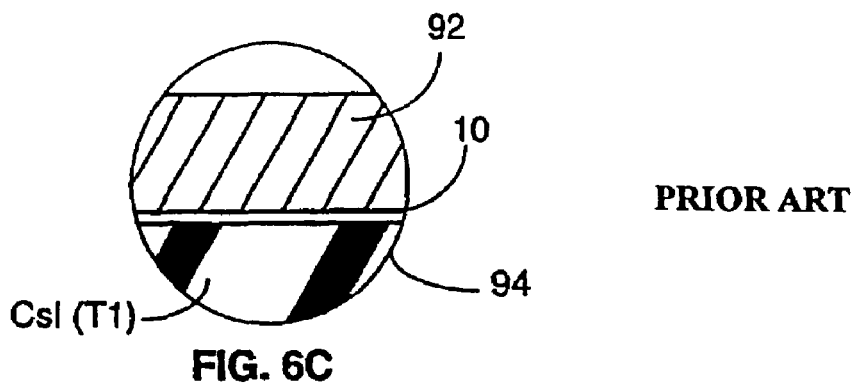
Figure 6D:
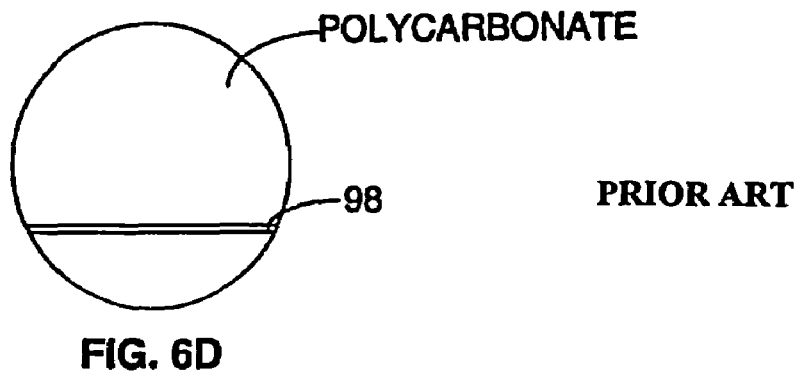

Another preferred source is a needle as shown in FIG. 4 with a radioactive submicron tip. The tip is a material that can be activated in a nuclear reactor (or other available nuclear activation facility) using well-known techniques for generating medical radiation sources. The tip material is chosen to provide the desired radiation energy. The tip can be positioned extremely close to the target to provide good geometric magnification.

Alpha Particle Generated X-Ray Spots

Figure 9:
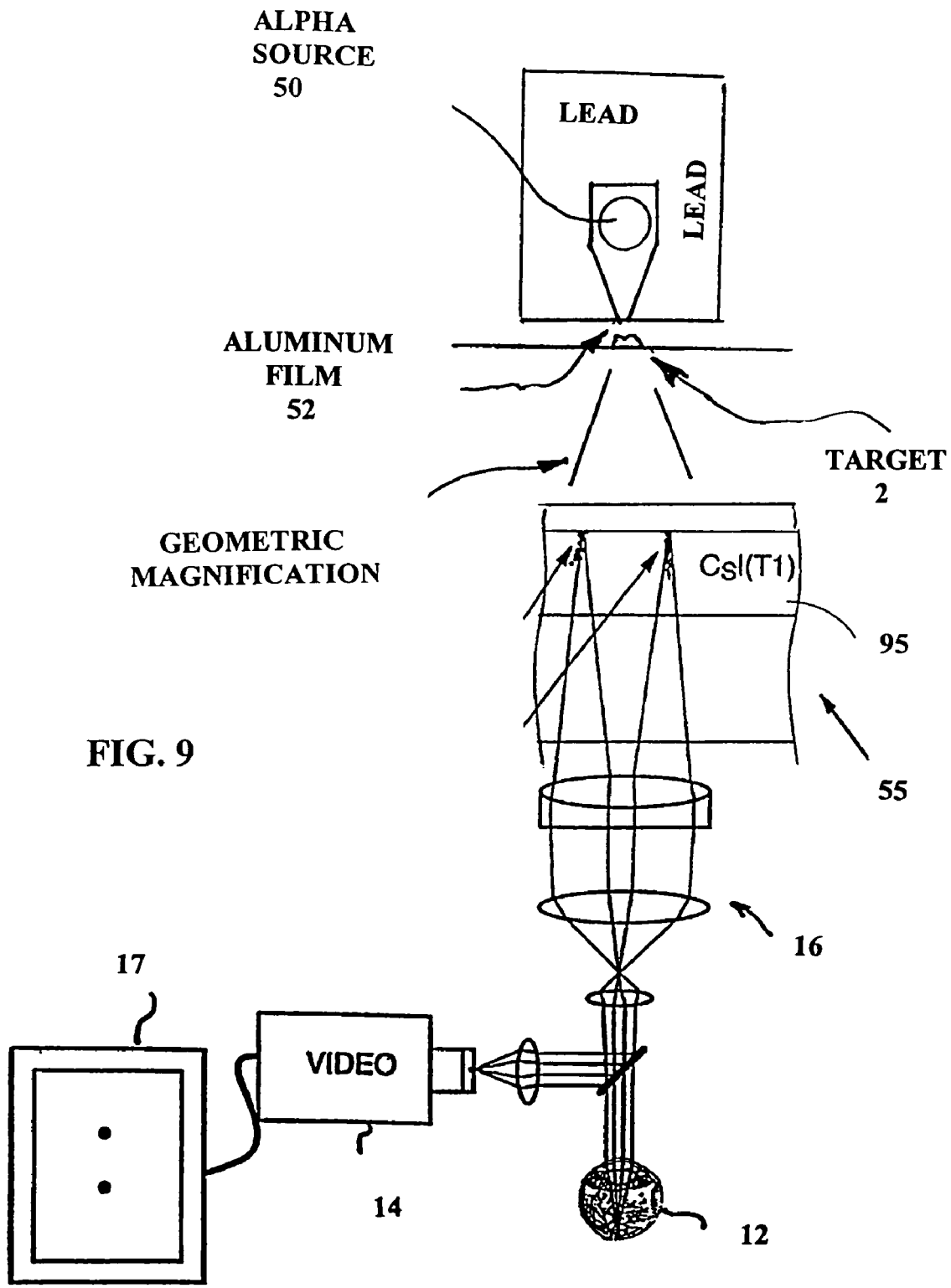
FIG. 9 shows the production of tiny x-ray spots with single alpha particles.

FIG. 9 shows a technique for generating submicron x-ray sources using an alpha particle source. The alpha source 50 is contained in a lead cage with an aluminum film 52 covering a small aperture at the bottom of the cage. The source and geometry of the cage is chosen so that alpha particles in general illuminate the film one at a time. The system records a large number of individual images. The video electronics are programmed to record an image each time scintillations are detected. Each image is produced from a small spot x-ray source; however, each image will be noisy from low photon count. Also, the illuminating spots distributed relatively randomly over the film aperture. Software is provided to images produced from similar locations on the film and for summing the scintillation data for a number of those locations.

High Resolution-Short Wavelength

Since a basic limitation on resolution is wavelength related diffraction, x-rays and high-energy UV have an advantage over visible light when it is necessary to distinguish micron and especially submicron size features. The above described scintillator based microscope provides excellent resolution. This excellent resolution is attributable to three special features of this system: (1) the use of x-rays or high-energy UV photons to form the basis image, (2) atomic neighborhood size pixel and (3) optical quality of the scintillation crystal.

Atomic Neighborhood Size Pixels

The second basic advantage provided by the above-described scintillator based microscope is derived from the utilization of the atomic structure of the crystal to provide the photon detecting pixels. X-ray or high-energy UV photons illuminating the illumination surface of the CsI (Tl) crystal undergo a photoelectron collision with an inner shell electron, which ejects the electron with substantial energy. This ejected electron then scatters within the atomic structure of the crystal for a distance of a few microns to up to about 100 microns depending on the energy of the illuminating photon. There is a forward directional preference so that the horizontal component of the ejected electron track is much shorter than that of the total track. The ejected electron loses its energy principally by reacting with electrons along its track transferring its energy to these electrons. These energetic electrons then move about within the crystal until they are captured within an atomic structure. Excited conduction electrons move reasonably freely through the CsI structure but can be trapped when they pass sufficiently near a Tl atom. Visible green light with wavelengths of about 550 nm is produced when an excited Tl atom releases a photon to return to a ground or lower energy state. The net result is that visible light is produced very near the point at which the illuminating photon underwent the photoelectron event. Thus, the size of each pixel is on the order of the atomic dimensions of the neighborhood surrounding each event.

Optical Quality Crystal

The third special feature of this microscope system results from Applicants' ability to create a high quality optical element out of CsI (Tl) salt crystals. By polishing the surfaces of the crystal and greatly minimizing Fresnel reflection, Applicants are able to look through the crystal at the illumination-reflection surface of the crystal with their eyes and the visible light detecting optical devices with no significant distortion. Using standard microscopic optical elements, Applicants are able to resolve the light produced in the crystals down to less than 5 microns. With geometric magnification, even greater resolution can be achieved. When photons from a very small spot photon source are imaged over long periods of time, Applicants expect to be able to image details in the Angstrom range.

Microscope Optical Design

For many applications, the optical objective 16 for collecting the light generated in the scintillator is preferably a very low f/#, high numerical aperture objective, in order to optimize the system efficiency, preferably on the order of f/1.0 (N.A.=0.5) or faster. This is especially important when viewing the target with the naked eye and when operating with a very tiny point source for providing high resolution geometric magnification. In addition, the objective preferably is achromatized due to the broadband spectrum of the CsI (Ti) scintillation and well corrected over the entire field-of-view to retain the inherently high resolution of the crystal. Several commercially available microscope objectives meet these requirements. Two such commercially available optical microscope systems which could be utilized to magnify images produced at the mirror-illumination surface of scintillator 55 are NIKON binocular microscope model #LAB-PHOT 2 and NIKON model #5MZ-2T. Both of these microscopes are fitted with a camera port for video or microscopic film photography. For higher resolution or for larger fields-of-view and other special situations, a custom optical design may be required as can be designed by persons skilled in the optics art with the current optical CAD programs such as CODE V or ZEMAX.

Focusing the Optical System

Scintillator with Reflecting Surface

Figure 7:
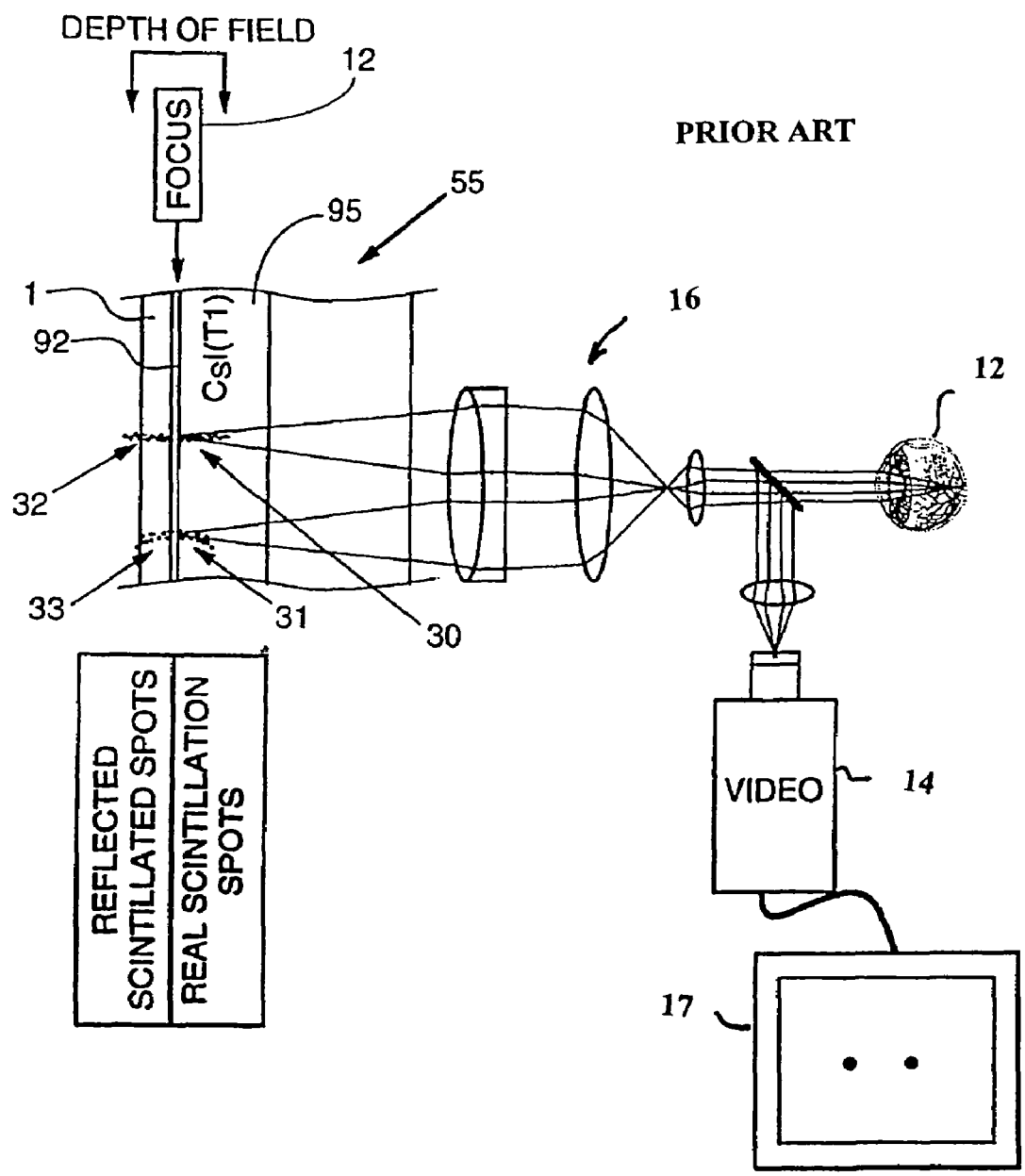
FIG. 7 shows how to focus a camera in a prior art x-ray microscope.

Each x-ray photon typically generates one scintillator spot as it is absorbed in the CsI (Tl) crystal. The most likely absorption location is at the point of x-ray entrance into the crystal, just down stream of aluminum mirror 92. However, many x-ray photons are absorbed at greater depths into the crystal. For scintillator designs utilizing a reflecting surface layer as shown at 92 in FIG. 7, spot locations within CsI crystal 95 are depicted at 30 and 31 as representing scintillations from x-ray absorptions. Each of these produces real images. Reflecting layer 92 produces virtual images of these spots as represented at 32 and 33 in FIG. 7. Our optical system focal plane is at the mirror—CsI crystal interface as shown at 12 on FIG. 7 and we prefer a depth of field that includes at least 86% of the real and virtual scintillation spots. As shown at 36 in FIG. 7, large numbers of lined up scintillations (real and virtual in scintillator 55, which would be representative of two narrow x-ray passage ways in the object being x-rayed) are imaged as two points on CCD array 40 and show up as two spots on the video monitor as shown in FIG. 7.

With No Reflecting Surface

Figure 7A:
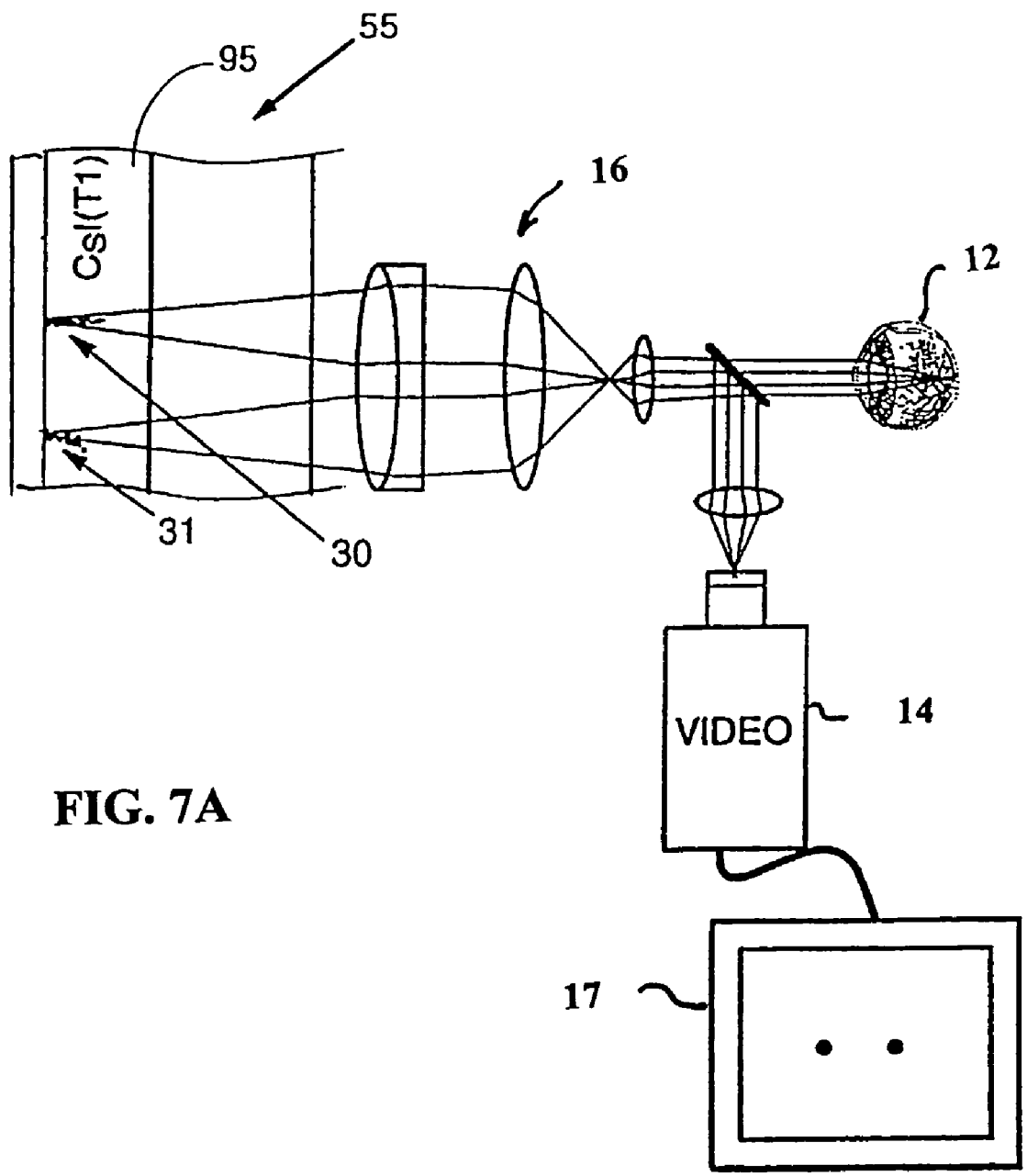
FIG. 7A shows how to focus a camera of a preferred embodiment of the present invention.
Figure 10:
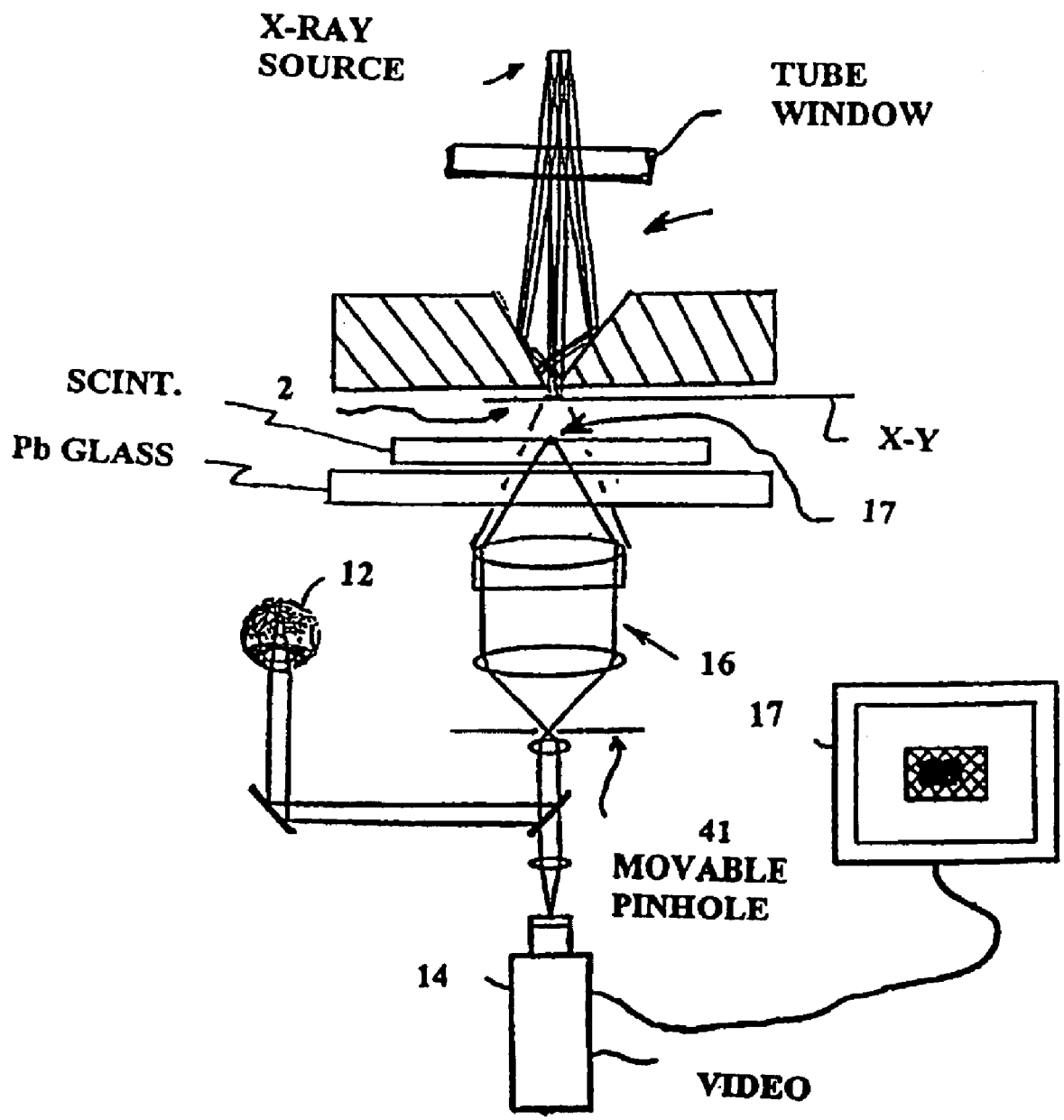
FIG. 10 shows a preferred embodiment utilizing confocal features.

FIG. 7A and FIG. 10 show a preferred embodiment in which the reflecting surface 92 has been replaced with an optically transmissive interface. This embodiment is a dual focus system that permits simultaneous observation of the surface of the sample and the image formed in the scintillator. For example, as shown in FIG. 2C, with the microscope ocular 12 focused on the surface of the sample 2 the video camera unit 14 can be focused on the image formed at the illumination surface of scintillator assembly 55. With microscopes that have two or more camera ports, one camera may be focused on the x-ray image formed in the scintillator and the other camera may be focused on the surface of the sample. If geometric magnification is employed so that the size of the x-ray image differs from that of the visible image, scaling software can be used to register the images. This capability is only possible when the reflective surface (previously specified in the '796 patent) is replaced with an optically transmissive interface. This has the potential to significantly add to the information/insight about the sample being examined.

Three Dimensional Imaging

A further feature of preferred embodiments is a 3-dimensional CT imaging capability based on the same geometry. If either the sample or the source is capable of being rotated relative to the microscope, a series of exposures can be taken that, when combined and registered to each other via software, can form a three-dimensional representation of the sample.

Other Microscope Techniques

Since preferred embodiments leverage the use of conventional microscopes, many of the advanced imaging techniques that have been developed for conventional microscopes can be used to enhance the imagery of the x-ray images collected with our system. For example, confocal microscopy is a technique that enhances image contrast by scanning both the illumination and imaging fields-of-view using rapidly moving apertures (pinholes). In our implementation the illumination system is replaced with the x-ray source but the scanning aperture shown at 41 in FIG. 10 on the imaging side would remain. This is just one example of many typical visible microscope techniques that can be utilized as embodiments of the present invention.

While the above description contains many specifications, the reader should not construe these as limitations on the scope of invention, but merely as exemplifications of preferred embodiments thereof. Those skilled in the art will envision many other possible variations are within its scope. CCD camera 16 could be any of many commercially available cameras which could produce either digital images or an analog image. An index matching fluid could be used as the interface between the illumination surface of the CsI crystal and the reflective surface of the reflector plate. For example, CARGILLE Company distributes an index matching fluid that closely matches the index of refraction of CsI the scintillator sandwich can be made as large as available crystal permits. Accordingly, the reader is requested to determine the scope of the invention by the appended claims and their legal equivalents, and not by the examples which have been given. Crystals as large as 24 inches by 24 inches are currently available, with some significant defects. Good quality crystals as large as 12 inches by 12 inches are currently available.

I claim:

1. A scintillator based microscope image system comprising:
    a) a submicron source of high energy radiation;
    b) a substantially rigid first plate substantially transparent in at least one spectral range within a spectral range including visible and ultraviolet ranges;
    c) a second plate substantially transparent in at least one type of ionizing radiation;
    d) a single crystal scintillation crystal defining a peak scintillation wavelength in the form of a crystalline plate sandwiched between said first and said second plates, said scintillation crystal defining an illumination surface and a viewing surface;
    wherein the high-energy radiation from said source are directed through a target to illuminate said illumination surface to produce a scintillation image of said target within said scintillation crystal; and
    e) dual focus optical microscopic elements for producing a magnified view of said scintillation image produced by said scintillation and also a visible light image of a surface of said target; said dual focus optical microscopic elements comprising:
        1) a first set of optical elements focused on said illumination surface to obtain a shadow image of the target showing internal features of the target, and
        2) a second set of optical elements focused on a surface of said target to obtain a surface image of the target.

2. A microscope system as in claim 1 wherein with both illumination surface and viewing surface of said crystal being treated to reduce Fresnel reflections in said crystal at said peak scintillation wavelength to less than about 1.0 percent and to reduce surface roughness to less than about 100 angstroms.

3. A microscope as in claim 1 wherein said scintillation crystal is a single crystal CsI crystal.

4. A microscope system as in claim 3 wherein said CsI crystal is doped to produce a CsI (T1) crystal.

5. A microscope system as in claim 2 and further comprising optical grade adhesive located in spaces between said rigid first plate and said scintillation crystal wherein said scintillation crystal has a crystal index of refraction at said wavelength and said optical grade adhesive defines an adhesive index of refraction at said wavelength, said peak scintillation wavelength crystal index of refraction and said adhesive index of refraction being similar enough to reduce Fresnel reflections at said illumination surface to less than about 0.5%.

6. A microscope system as in claim 1 wherein said submicron high energy photon source is an x-ray source.

7. A microscope system as in claim 1 wherein said submicron high energy photon source is a high energy ultraviolet source.

8. A microscope system as in claim 1 wherein said submicron high energy photon source is a gamma ray source.

9. A microscope system as in claim 6 and further comprising a pinhole unit to provide a submicron high energy photon source.

10. A microscope system as in claim 9 wherein said pinhole is a funnel-type pinhole unit.

11. A microscope system as in claim 9 wherein x-rays are produced by alpha particles.

12. A microscope system as in claim 11 wherein said x-rays are produced by interaction of said alpha particles with a metal foil.

13. A microscope system as in claim 9 wherein said pinhole unit is an adjustable pinhole unit.

14. A microscope system as in claim 13 wherein said adjustable pin hole unit comprises two sets of two spaced apart plates each set defining a narrow crack with varying widths.

15. A method of making an image of at least a portion of a target utilizing a microscopic optical system and a scintillator comprising a single crystal scintillation crystal in the form of a plate, said scintillation crystal defining an illumination surface, said method comprising the steps of:
 a) illuminating from a submicron source said target with a beam of radiation having sufficient energy such that a portion of said beam is absorbed in said target and a portion passes through said target to define a shadow beam; a portion of said shadow beam passing through a reflector and being absorbed in said crystal to produce visible light scintillations in said crystal;
 b) focusing said microscopic optical system at or near said illumination surface to provide a magnified internal features view of said target; and
 c) providing a comparison visible light microscopic view of a surface of said target utilizing a set of visible light optical elements focused on a surface of said target.

16. A method as in claim 15 wherein said submicron high energy photon source is an x-ray source.

17. A method as in claim 15 wherein said submicron high energy photon source is a high energy ultraviolet source.

18. A method as in claim 15 wherein said submicron high energy photon source is a gamma ray source.

19. A method as in claim 15 and further comprising a pinhole unit to provide the submicron high energy photon source.

20. A method as in claim 19 wherein said pinhole is a funnel-type pinhole unit.

* * * * *